(12) United States Patent
Shi

(10) Patent No.: US 6,289,227 B1
(45) Date of Patent: Sep. 11, 2001

(54) METHOD AND APPARATUS FOR SCHEDULING WAKE-UP TIME IN A CDMA MOBILE STATION

(75) Inventor: Yu Shi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/314,998

(22) Filed: May 20, 1999

(51) Int. Cl.$^7$ .................................... H04B 1/16
(52) U.S. Cl. ..................... 455/574; 455/38.4; 455/343; 455/458; 455/575; 340/7.32; 340/7.33; 340/7.34; 340/7.35
(58) Field of Search .................... 455/574, 343, 455/458, 38.2, 556, 466, 515, 422, 517; 340/7.32, 7.33, 7.34, 7.35, 7.36, 7.37, 7.38

(56) References Cited

U.S. PATENT DOCUMENTS

| | | | |
|---|---|---|---|
| 5,404,355 | * 4/1995 | Raith | 370/95.1 |
| 5,590,396 | * 12/1996 | Henry | 455/426 |
| 5,625,629 | * 4/1997 | Wenk | 370/347 |
| 5,745,860 | * 4/1998 | Kallin | 455/574 |
| 6,072,987 | * 6/2000 | Willey | 455/38.2 |

* cited by examiner

Primary Examiner—Thanh Cong Le
Assistant Examiner—Yemane Woldetatios
(74) Attorney, Agent, or Firm—Philip R. Wadsworth; Charles D. Brown; Raymond B. Hom

(57) ABSTRACT

A method and apparatus for scheduling the paging wake-up time in a wireless mobile station. The decision to wake-up a mobile station in order to decode a slotted paging message is determined probabilistically. An initial missed page rate constant, M, is loaded within the mobile station. A measurement of the particular mobile station paging rate, R, is made over a time period T. The measured paging rate R is compared to the initial missed page rate constant M. If the missed page rate M is greater than the measured paging rate R the mobile station does not respond to the next paging slot. If the missed page rate M is less than the measured paging rate R a number based on the ratio of M to R is used as an input to a uniform random number generator. The output of the uniform random number generator determines whether or not to wake-up during the next paging slot. The measured paging rate R is updated as a running average. A new value of a variable missed page rate M' is calculated based on R and the initial value M. The value of the variable missed page rate M' is updated and compared to the running average of the measured paging rate R in order to make subsequent wake-up decisions.

9 Claims, 5 Drawing Sheets

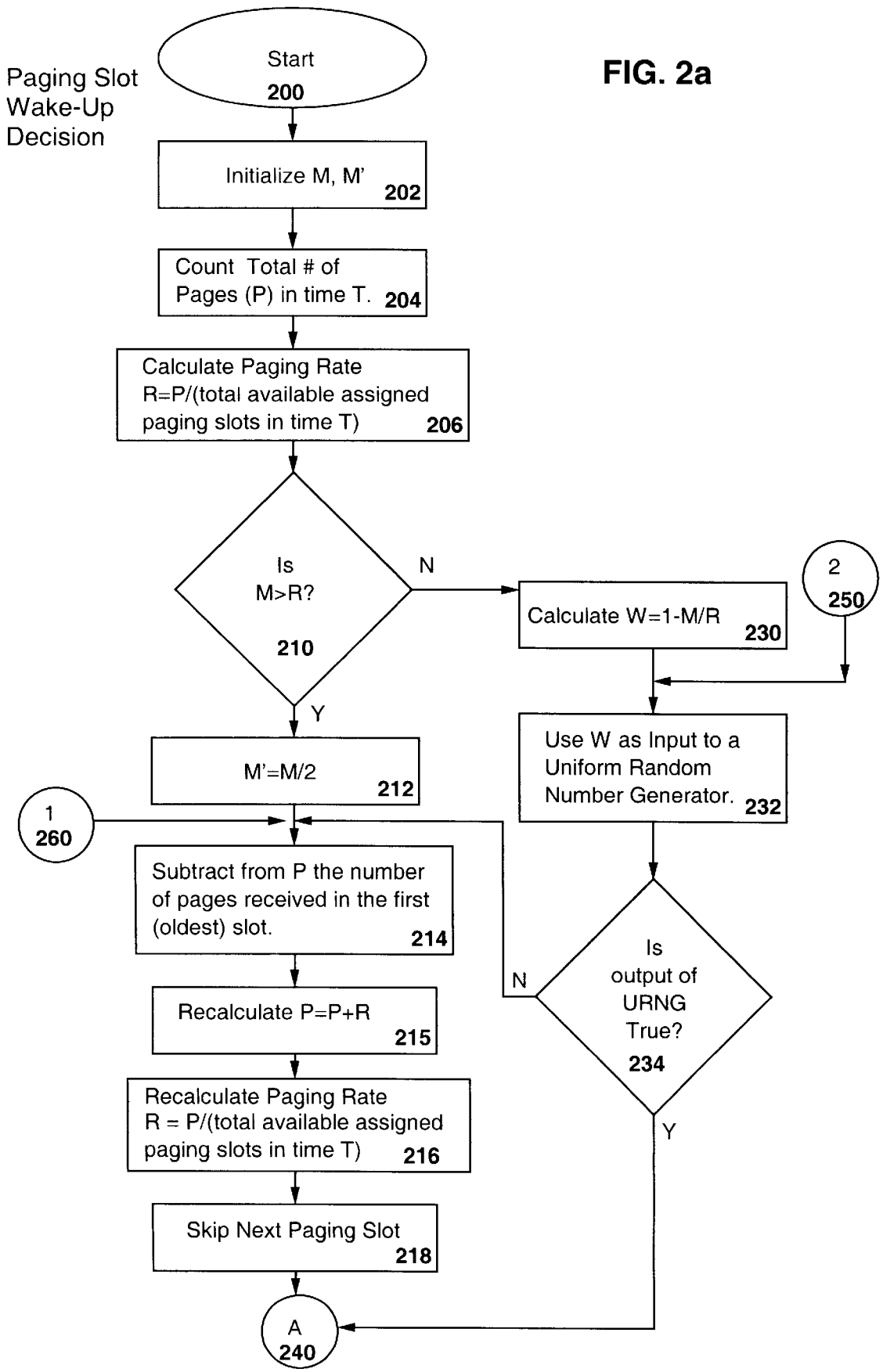

METHOD AND APPARATUS FOR SCHEDULING WAKE-UP TIME IN A CDMA MOBILE STATION

BACKGROUND OF THE INVENTION

I. Field of the Invention

The present invention relates to wireless communications. More particularly, the present invention relates to a novel and improved method and apparatus for scheduling wake-up time in a mobile station in a slotted paging environment.

II. Description of the Related Art

The effort to efficiently transmit information to remote individuals can be satisfied in a variety of ways. Probably the most common remote communication device is the pager. Paging systems consist of a Public Switched Telephone Network (PSTN), a paging system controller, and a small number of transmitters broadcasting messages to remote paging receivers. To transmit a message to a pager a sender enters information through the PSTN. The sender does this by calling the pager telephone number and entering the information using the sender's telephone keypad. A sender may also use a computer with a modem to enter the information. The PSTN is linked to a paging system controller where the message entered by the sender is encoded such that the message will only be decoded by the intended pager. The encoded paging message is then sent to the transmitters for broadcast to the pager.

Paging systems allow a person to communicate in a limited manner to a remote pager. However, the information that can be transmitted to a pager is extremely limited. In the case of numeric pagers, the pager display can only show numeric messages. Typically only the sender's phone number is transmitted to the pager. The sender must rely on the paging recipient to call the phone number to communicate any more detailed information. The paging recipient may or may not be able to respond depending on the availability of a nearby telephone.

An improvement over the numeric pager is the alphanumeric pager. The alphanumeric pager is able to display alphabetic as well as numeric characters. This allows the sender to transmit a text message to the pager. The alphanumeric pager enables short messages to be transmitted that may not require any response from the paging recipient. When a reply is required from the paging recipient a phone number can be included in the message. To reply, the paging recipient would be required to call the sender as in the case of a numeric pager. Longer messages are more awkward since the pager display is limited to minimize the physical size of the pager. A user is required to scroll through a message that is longer than the pager's display length.

A disadvantage of the traditional paging system is that the paging communication link is one way. The pager can only notify a user of a received transmission and must continually await the receipt of a paging message. Pagers are merely receivers and do not provide any acknowledgement to the transmitting system that the message has been received. The paging network transmitters retransmit the message a limited number of times to increase the probability that the pager will receive the message. The paging network is also unable to determine the location of any pagers in the network. To overcome the inability to locate pagers within the system the paging network transmits all paging messages in all transmitters within the network.

Some of the disadvantages of a traditional paging system are overcome by the incorporation of a paging receiver within a wireless telephone. Nearly all wireless telephones incorporate an alphanumeric display. Short text messages can be transmitted to wireless phones in the same manner as would be transmitted to a pager. Where a user reply is requested, the recipient has ready access to a telephone. The need for the numeric message style page is essentially eliminated since the calling party could dial the number for the cellular phone rather than sending a page and waiting for the recipient to call back.

Particular implementations of paging within a wireless telephone network include those described in TIA IS-95, MOBILE STATION-BASE STATION COMPATIBILITY STANDARD FOR DUAL-MODE SPREAD SPECTRUM CELLULAR SYSTEM, May 1995. Other Code Division Multiple Access (CDMA) wireless phones have implemented similar paging abilities.

The following description details some of the advancements and improvements gained under the CDMA implementation of paging within a wireless phone. In a CDMA wireless phone network a base station controller interfaces the Public Switched Telephone Network (PSTN) to the wireless network. The base station controller, in turn, links with multiple base station transceivers that control the wireless communication to the phone. When paging ability is implemented within a wireless phone the user no longer needs to carry two pieces of hardware. Additionally, the user is able to reply to short text messages using a readily available phone. However, improvements over the traditional paging system extend far beyond merely co-locating a pager with a wireless telephone. The use of CDMA is advantageous when integrating paging within a wireless phone. The use of CDMA allows the phone receiver to operate on one frequency and to distinguish between paging and traffic messages based on the code channel assigned to the message. Traffic messages may be voice or data messages. Specific codes correspond to Paging Channels and other codes correspond to Traffic Channels. Using codes rather than unique frequencies eliminates the need to actively modify the tuning frequency of the receiver to correspond to paging or traffic channels.

The wireless phone's ability to transmit messages provides major improvements to the paging network that may not be obvious to the user. The transmitter portion of the phone allows the phone to acknowledge when a paging message has been received. If acknowledgement is requested by the base station the phone is able to transmit an acknowledge message and send it to the base station using an Access Channel. The phone's ability to acknowledge messages decreases the base station's need to repeatedly retransmit paging messages. Eliminating the base station's need to repeatedly retransmit paging messages increases the capacity of the paging system.

Additionally, a CDMA phone periodically registers with the base station transceiver that is providing coverage in the area the phone resides. When the CDMA phone registers, the base station controller is provided information as to the general location of the phone. When paging messages are generated for a particular phone the paging system is not required to transmit the message from all transmitters but can limit the transmission to the base station transceivers that are within the vicinity of the last phone registration. Limiting the transmissions results in an increase in the capacity of the paging system since not all transmitters are required to transmit the same message at the same time.

The wireless phone operates primarily from battery power. Extending battery life maximizes the talk times and standby times of the phone. To conserve battery power the CDMA phone can be instructed to only respond to pages during specific time periods. During time periods when the phone is not required to actively monitor the Paging Channel the phone can power down into a sleep mode to conserve power. In slotted paging the phone is assigned specific time periods where the phone must actively monitor the Paging Channel. In the CDMA system described in TIA IS-95, the slotted paging structure is defined as having a maximum slot cycle consisting of 2048 paging slots of 80 milliseconds in length. The phone is able to inform the base station that it will operate in slotted mode. The wireless phone tells the base station what slot cycle timing it will be using. The wireless phone then monitors the Paging Channel during the assigned slot cycle. In general, slotted paging refers to any division of a maximum slot cycle into sub-slots where the phone is only required to actively monitor the sub-slot assigned to it. During the periods in which the phone is not monitoring the Paging Channel the phone decreases operation to a sleep level to maximize power conservation.

Although the use of slotted paging allows the wireless phone to conserve power the phone still must monitor every slot assigned to it. This cyclic monitoring of the Paging Channel can be improved to further minimize power consumption within the phone. The likelihood of any particular phone receiving a page in a specific paging slot cycle is probabilistic. Moreover, the probability of receiving a page within any paging slot cycle is a random process that varies with time. What is required is a method of making wake-up decisions within the phone that allows the phone to skip assigned paging slots. The decision to skip assigned paging slots must ensure that the probability of a missed page is low.

SUMMARY OF THE INVENTION

The present invention is a novel and improved method and apparatus for scheduling the wake-up time in a mobile phone operating in slotted paging mode. The method by which the phone monitors the Paging Channel can be optimized by probabilistically varying the decision to monitor the assigned paging slot cycle. As the probability of receiving a paging message decreases the likelihood that the phone will skip the next assigned paging slot cycle should increase. Thus the probability will be high that the skipped paging slot cycle will not contain a paging message. In this manner the drain on the battery power of the phone will be minimized thereby maximizing the phone talk times and standby times. The mobile phone is initialized with a constant, M, which represents a missed page rate. The phone first makes an empirical estimate of the paging rate R. The phone then uses a probabilistic algorithm to determine whether or not to ignore the next assigned paging slot. The value of a variable missed page rate, M', is adjusted based upon the empirical estimate of the paging rate, R, and the initial assigned missed page rate M. For subsequent assigned paging slots the phone updates a running estimate of the current paging rate, R, as each assigned paging slot is encountered. After each assigned paging slot, the phone uses the variable missed page rate, M', with the updated paging rate, R, in the probabilistic determination of whether or not to ignore the next assigned paging slot. The variable missed page rate, M', is then scaled up or down depending on the relationship between, M', and the updated paging rate R. By adjusting the variable missed page rate, M', the number of assigned paging slots that are skipped varies with variations in the paging rate R. However, a decision to skip an assigned paging slot will always be followed by a decision to wake-up at the assigned paging slot immediately following the skipped assigned paging slot.

The initial missed page rate M is stored in non-volatile memory within the phone and can be chosen at the time the phone is first programmed by the manufacturer. The phone is able to keep a running update of the paging rate by using memory locations to store the number of pages received. As new assigned paging slots are encountered the number of pages received in the oldest slot are overwritten with the number of pages received in the current assigned paging slot. A digital processor calculates the value of the paging rate, updates the variable missed paging rate, and performs the probabilistic determination of whether or not to skip the next assigned paging slot.

By selectively skipping assigned paging slots the phone is able to remain in sleep mode for longer periods of time and thus conserve battery power. Since the decision to skip paging slots is based on the probability that a page will be received, the likelihood that a page will actually be missed remains low.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 2a–2c are flow charts showing the wake-up routine; and

DETAILED DESCRIPTION OF THE PREFERRED EMBODIMENTS

Figure 1A:
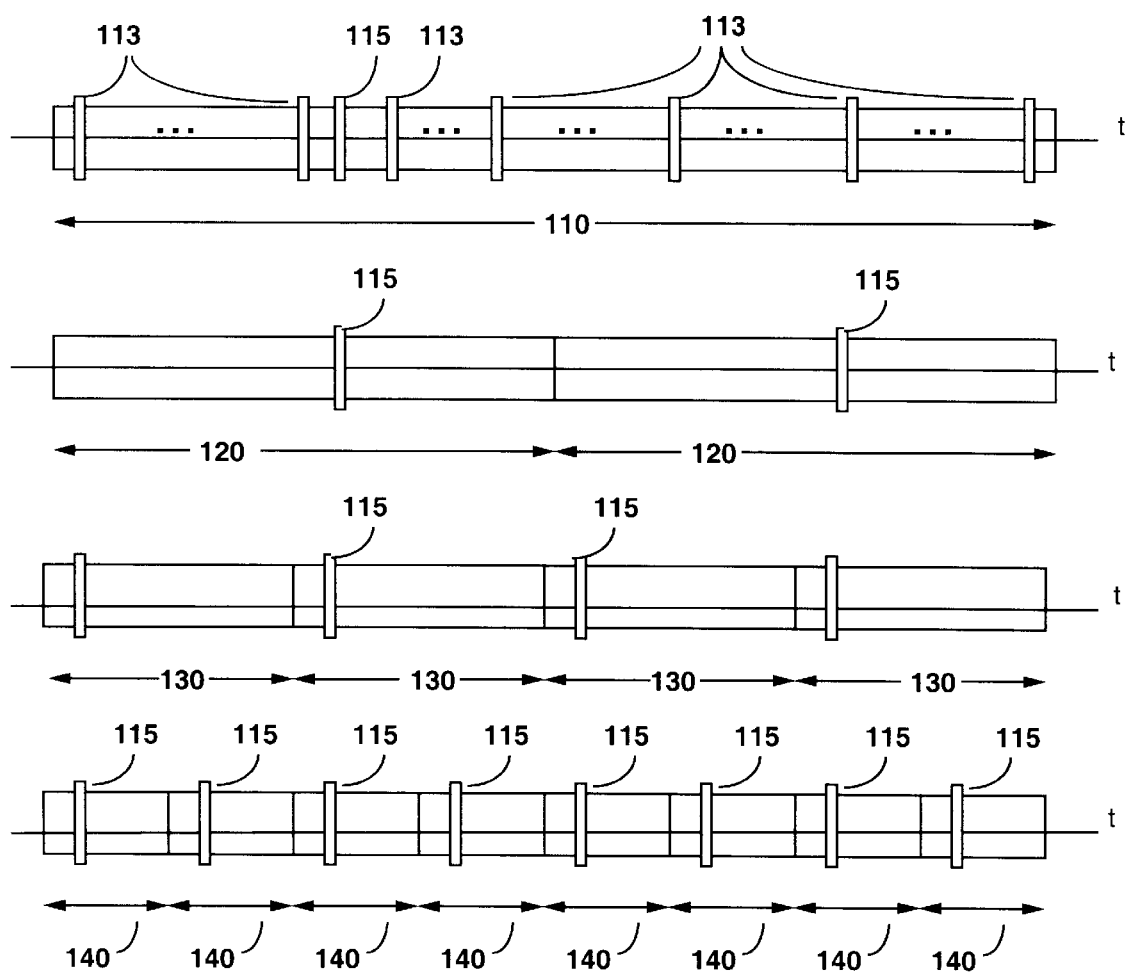
FIGS. 1a–1b illustrate slotted paging with the ability to skip specific assigned paging slots.
Figure 1B:
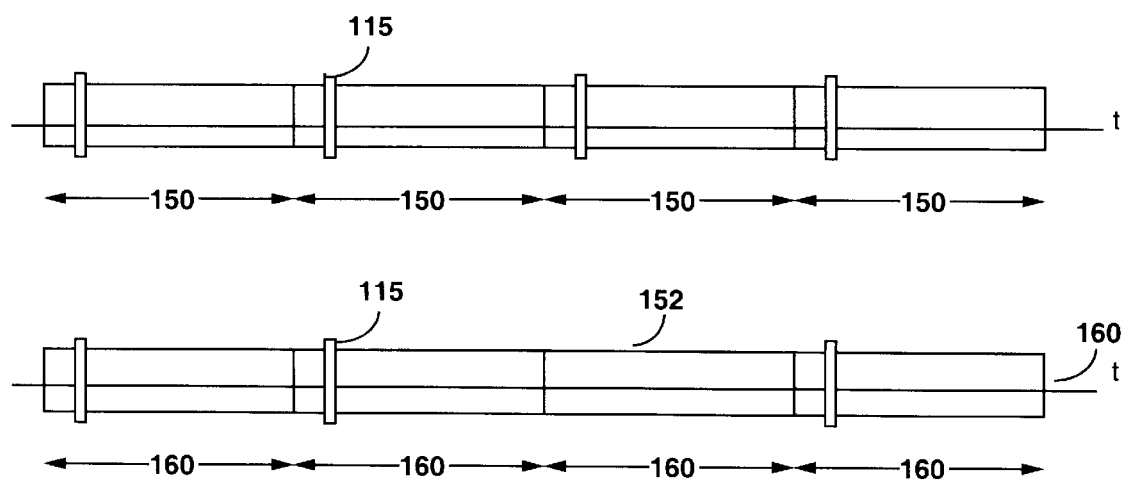

Referring to FIG. 1a, slotted paging refers to the assignment of a particular paging time slot within a paging slot cycle to a mobile phone. The horizontal axes in FIGS. 1a–1b represent time. According to the IS-95 standard a maximum slot cycle 110 is composed of 2048 paging slots. Each paging slot 113 is 80 milliseconds long, resulting in a maximum slot cycle 110 length of 163.84 seconds. Within the maximum slot cycle 110 a phone will be assigned to a specific paging slot 115. The phone will power down to a sleep mode when not monitoring its assigned slot 115. In the maximum slot cycle 110 there exists one assigned paging slot 115 and 2047 other paging slots 113. In FIG. 1, paging slots 113 other than the assigned paging slot 115 are only representatively shown in the maximum slot cycle 110 and are not shown for any of the other slot cycles 120, 130, 140, 150, and 160 for the sake of clarity.

Assigning specific paging slots allows the phone to conserve battery power, thereby maximizing battery life, talk time, and standby time. To adjust the time between assigned slots the system can divide the maximum slot cycle 110 into smaller slot cycles 120, 130, and 140. The value of the Slot Cycle Index (SCI) determines the length of the slot cycle. The phone sends the base station the SCI value along with the paging slot assignment. A Slot Cycle Index value of seven corresponds to the maximum slot cycle length 110. For decreasing values of the SCI the slot cycle length is halved. Therefore a SCI of six would result in a slot cycle length that is half as long as the maximum slot cycle length 110. Decreasing slot cycle lengths are shown in FIG. 1a as 120, 130, and 140. Regardless of the slot cycle length the phone is assigned one paging slot 115 within each of the slot cycles. There is the possibility of multiple paging messages within each assigned paging slot but for any one phone there will not be greater than one paging message within each assigned paging slot. More than one phone can be assigned to the same paging slot, but the paging message is addressed to the particular phone it is intended to reach. Therefore a phone will not decode a paging message that is not addressed to it.

Referring to FIG. 1b, for a given Slot Cycle Index a slot cycle 150 is defined and a paging slot 115 is assigned to the phone. Prior to the present invention, the phone must monitor the assigned slot 115 within each slot cycle 150. In the present invention the phone decides probabilistically whether or not to monitor a given assigned paging slot 115 within any assigned slot cycle 150. The phone can decide to ignore the assigned paging slot within a particular slot cycle 152. This is done at the risk of missing a page, since the base station continues to broadcast pages to individual phones according to the paging slot assignments. The phone independently makes the decision to ignore a particular paging slot if it determines that the probability of a missed page is beneath a threshold.

The decision to wake-up and monitor or to ignore a particular paging slot is determined using a routine that compares an allowable missed page rate M with an estimate of the current paging rate R. Referring to FIG. 2a, the routine first initializes the value of the missed page rate M in step 202. This value is generated by the phone manufacturer and loaded into nonvolatile memory within the phone at the same time that the phone is programmed. The constant M represents an initial acceptable missed page rate. The routine also initializes a value for the variable missed page rate M' to be equal to M. The value of the variable missed page rate M' will be used for all wake-up decisions except for the first. The wake-up routine will adjust subsequent values of M' based upon the initial value of M. The wake-up routine retrieves the value of M from the storage location in nonvolatile memory. The phone then empirically derives the paging rate R. In step 204 the total number of pages P in a time T is measured. To do this, the phone monitors each assigned paging slot over a time period T and counts the number of pages received. The number of pages received corresponds to the number of pages that are addressed to the phone. The time period T should be sufficiently long to allow for a good estimate of the paging rate.

There are a number of design concerns to be evaluated in choosing the time T. Time T will be the window size used for subsequent calculations of the moving average of the paging rate. If time T is chosen to be very long relative to variations in the paging rate then short bursts of paging activity have very little effect on the average paging rate. However, if time T is chosen to be very short then the average paging rate is highly influenced by bursts of paging activity. It must also be noted that for a given time T the number of assigned paging slots will vary in proportion to the choice of Slot Cycle Index. The advantage of using this method is that the change in the paging rate varies in relation to a fixed time window. For low values of SCI, the time between assigned paging slots is low. For higher values of SCI the time between assigned paging slots is proportionally higher. Therefore, in a given time T, the paging rate will be more sensitive to bursts of paging activity for high SCI. An alternative method of defining time T is to choose a specific number of paging slots to use in the calculation of the paging rate. Then time T varies in proportion with the Slot Cycle Index. The advantage of using this method is that the value of SCI has no effect on the sensitivity of the paging rate.

Using the second method, if the number of assigned paging slots to be averaged is fifty and the SCI is seven, time T is 136.53 minutes, or a little over two hours. In comparison, if the number of assigned paging slots is fifty and the SCI is three, time T is 8.53 minutes.

The measurement time T can also be adjusted to compensate for traffic call periods. Traffic calls are voice calls and data calls. During the time the user is engaging in a traffic call the phone will necessarily not receive pages. If the paging rate calculation covers a time frame in which the user is engaged in a traffic call the calculated paging rate may not accurately reflect the true paging rate. To compensate for user traffic calls the measurement time T is suspended when the user is engaged in a traffic call.

The number of pages received in the total number of assigned paging slots encountered during the time T is saved in a unique memory location. Each assigned paging slot in time T has a memory location that records whether or not a page was received during that slot. The statistics regarding the number of pages received are maintained in addition to standard paging message servicing. Any received page will be serviced according to the standard paging software incorporated within the phone. The total number of pages P received in time T is then merely the sum of the values in the memory locations representing the assigned paging slots. The paging rate R is then calculated in step 206 as the total number of pages P in time T divided by the total number of available paging slots in time T. The paging rate R is necessarily a fraction less than one since the limit is one page for every assigned paging slot. Once the paging rate R has been calculated, the routine advances to decision step 210. In decision step 210 the routine asks whether the missed page rate M is greater than the measured paging rate R. If the missed page rate M is greater than the measured paging rate R, the original value of M is too high and will result in the phone skipping too many assigned paging slots. This would result in an unacceptable number of missed pages. To rectify the situation of an excessive initial missed page rate M, the routine in step 212 scales the value of the variable missed page rate M'. The new value of M' is M/2.

The routine then advances to step 214 where the number of pages received in the oldest slot is subtracted from the value of P. This is done such that a moving average of the paging rate R can be calculated. Calculation of the moving average of the paging rate R is facilitated by using individual memory locations corresponding to each assigned paging slot in time T. Each individual memory location holds the number of pages received during that assigned paging slot (zero or one). The value of R is then the sum of each of the contents of the memory locations divided by the number of memory locations. The calculation of the moving average is further facilitated if the memory locations are configured as a stack. When the value representing the number of pages in the most recent assigned paging slot is pushed onto the stack, all other entries in the stack move down one location to displace the next oldest value. The oldest value is then lost. This can be visualized as a First In First Out (FIFO) stack. The most recent value is pushed onto the top of the stack causing all other values to move down one location. The bottom most value emerges from the stack to be discarded.

In anticipation of skipping the next assigned paging slot the value of the paging rate R is pushed onto the stack. The value R is used in lieu of any value that would be determined from the assigned paging slot if the phone were to wake-up. The value of the paging rate R is used because R corresponds to the probability that the next assigned paging slot will contain a page. The next active paging slot will be skipped so an estimate of the number of pages in the skipped assigned paging slot is the probability that the assigned paging slot would have contained a page. Pushing the value R onto the stack also maintains the length of the stack such that no value in the stack represents a value older than time T.

Once the value of R is pushed onto the stack the routine proceeds to step 215 to recalculate the total number of pages P by summing all the values in the stack. The routine then advances to step 216 where the value of the paging rate is updated using the new value of P. The updated value of the paging rate R equals P divided by the total number of paging slots in time T. The routine then proceeds to step 218 where the phone ignores the next assigned paging slot. This is accomplished by maintaining the phone in the sleep mode when the assigned paging slot occurs. The routine proceeds to point 240 following the passage of the assigned paging slot to be skipped.

If at decision step 210 the value of M is not greater than R the routine proceeds to step 230. In step 230 a value W is generated for input to a Uniform Random Number Generator (URNG). The value W is equal to (1-M/R) and represents the probability that the phone will wake-up at the next assigned paging slot. The value W is input to a Uniform Random Number Generator (URNG) in step 232.

The URNG uses the output of a random number function which generates a random number uniformly distributed over 1–100. In uniform distribution any number over the distribution range has equal probability of being generated. For a discrete set of N numbers the probability that any particular number will be returned is 1/N, given uniform distribution. For a sequential discrete set of N numbers the probability that the random number function will generate a number less than the Xth value in the sequence is X/N, given uniform distribution. Thus for a discrete set of integers uniformly distributed over 1–100 the probability that the random number function will generate a number less than X is X/100.

If the random number function returns a number less than 100*W then the URNG returns a TRUE. Otherwise the URNG returns a FALSE. From the above discussion on uniform distributions it can be seen that W, the input to the URNG, represents the probability that the output of the URNG will be TRUE. The operation of the URNG is summarized in the flow chart of FIG. 2c. In step 2002 the URNG receives an input value from an external routine. The external routine in this case would be the wake-up routine. In step 2004 the URNG calculates the value 100× input value. The URNG then uses a uniform random number function to generate a random number over the range [1, 100], step 2006. In decision step 2008, the generated random number is compared to 100× input value. If the generated random number is less than 100× input value the URNG returns a TRUE 2010. If the generated random number is not less than 100× input value then the URNG returns FALSE 2012. Alternatively, if the uniform random number function is able to generate a random number over the range [0.01, 1.00] there is no reason to multiply the input value by 100.

Referring back to FIG. 2b, decision step 234 checks to see if the output of the URNG is TRUE or FALSE. If the output of the URNG is FALSE the routine proceeds to step 214 as described above. A FALSE output from the URNG causes the wake-up routine to skip the next assigned paging slot. Therefore, the value W represents the probability that the phone will wake-up at the next assigned paging slot. If the output of the URNG is TRUE the wake-up routine proceeds to point 240.

Figure 2B:
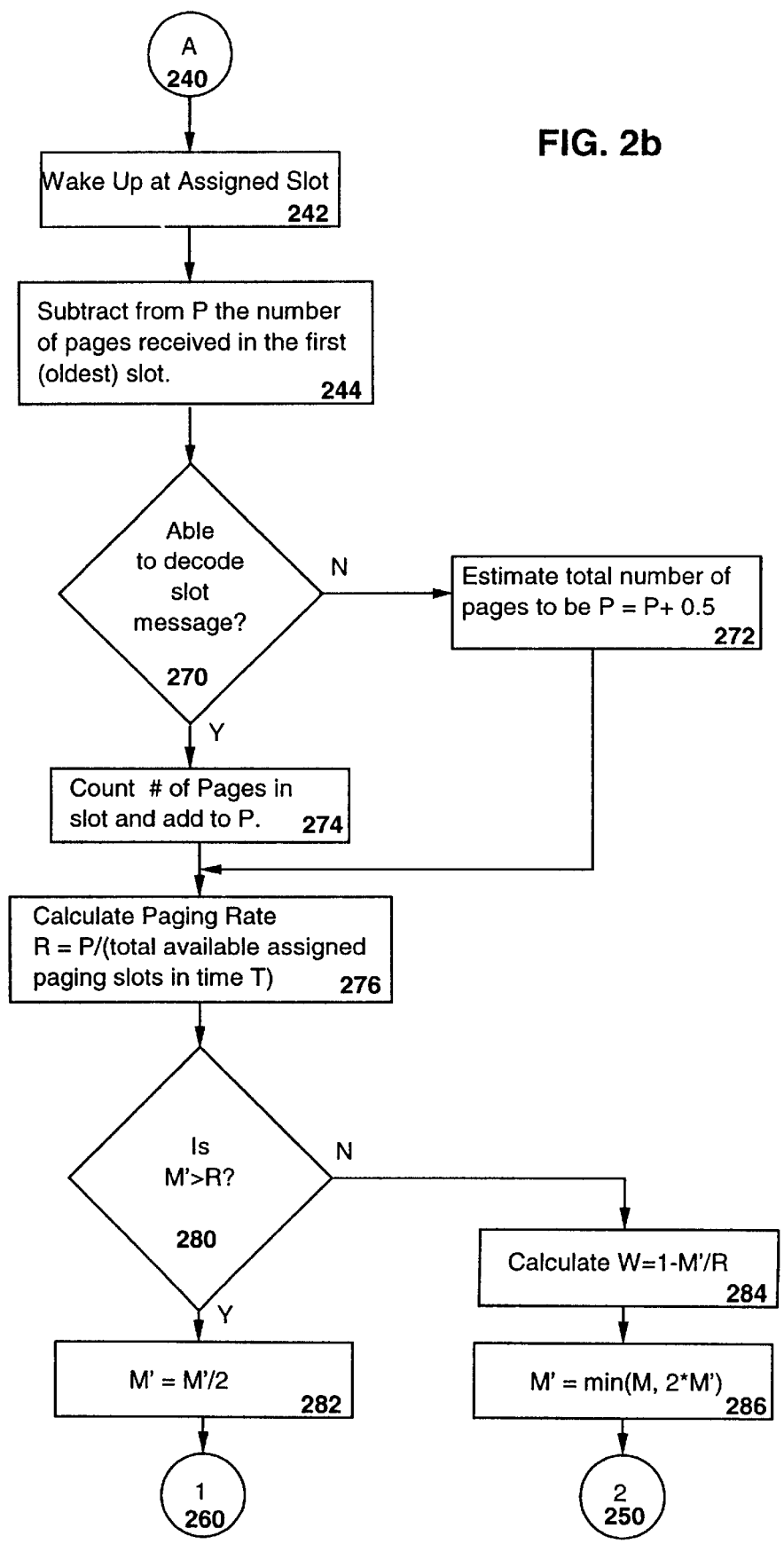
Figure 2C:
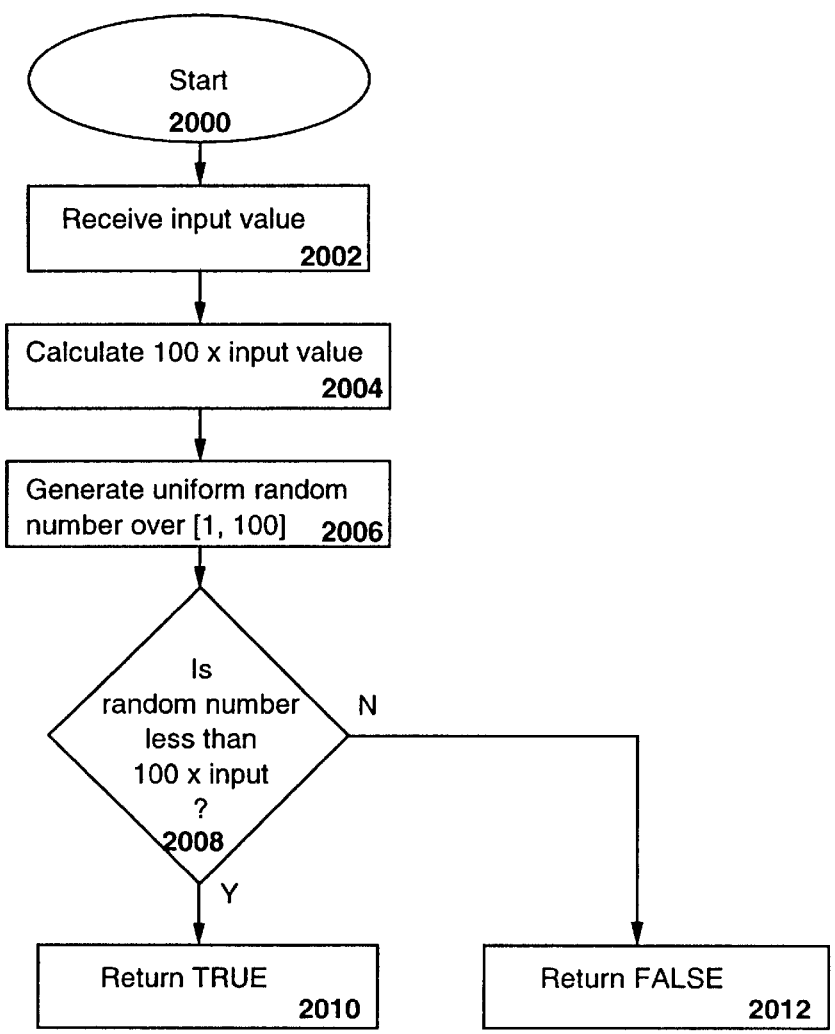

Point 240 links the flow chart shown in FIG. 2a to the flow chart shown in FIG. 2b. Referring to FIG. 2b point 240 directs the flow of the wakeup routine to step 242. Step 242 directs the phone to wake-up at the next assigned paging slot. The wake-up routine then proceeds to step 244 where the number of pages received in the oldest paging slot is subtracted from the value of P. To accomplish this the value in the memory location corresponding to the oldest paging slot is cleared. Alternatively, if the FIFO stack is used, subtracting the number of pages received in the oldest paging slot can be combined with updating the total number of pages by pushing a new value on to the stack. The new value to be pushed onto the stack is determined in the steps 270–274.

In decision step 270 the routine checks to see if the phone was able to decode the paging slot message. There are a number of reasons that the phone would not be able to decode the slot message. The inability to decode the assigned slot message may be due to fades in the RF signal from the base station to the phone or because the phone is located in a signal null in the forward link path during the time of the assigned paging slot. If the phone is able to decode the slot message the routine proceeds to step 274 where the phone counts the number of pages received in the assigned slot. The total number of pages P is then recalculated. If the stack memory method of storing page counts is used, the number of pages received in the current paging slot is pushed onto the stack and all the values in the stack are summed to achieve the value of P. The running count of pages within a time frame T is easily calculated using the stack since the stack automatically discards the oldest value in the stack when a new value is pushed onto the stack. If decision step 270 determines that the phone was unable to decode the current paging slot the wake-up routine proceeds to step 272. Since the phone was unable to decode the paging slot message an estimate must be made of the number of pages in the paging slot in order to update the running total of pages P. The wake-up routine assigns an equal likelihood to the probability that a paging message would have been received and to the probability that no paging message would have been received in the undecoded paging slot. Therefore the number of pages assigned to the undecoded paging slot is 0.5. The value of P is updated to be P=P+0.5. If the stack memory method of storing page counts is used, the value 0.5 is pushed onto the stack and all the values in the stack are summed to achieve the new value of P. The number 0.5 can be chosen to correspond to a probability of an assigned paging slot containing a paging message. In this example, the probability is estimated at 0.5.

Once the value of P has been updated, whether by actual count as in step 274 or estimate as in step 272, the wake-up routine proceeds to step 276. At step 276 the value of the paging rate R is updated using the updated value for P. As in other steps within the wake-up routine, the value of R is equal to the total number of pages P divided by the total number of assigned paging slots in time T.

Once the value of the paging rate R has been updated in step 276 the wake-up routine proceeds to decision step 280. In decision step 280 the wake-up routine checks the value of R against the variable missed page rate M'. If the value of the variable missed page rate M' is greater than the value of the paging rate R the routine proceeds to step 282. In step 282 the wake-up routine reduces the value of the missed page rate M' by a factor of two. The wake-up routine then returns to point 260, which proceeds to step 214 in FIG. 2a. If at decision step 280 the wake-up routine determines that the value of the variable missed page rate M' is less than the value of the paging rate R the wake-up routine proceeds to step 284. At step 284 the wake-up routine calculates the value of W=(1−M'/R). This value of W will be used as the input to the Uniform Random Number Generator to determine whether or not to skip the next assigned paging slot. The wake-up routine next proceeds to step 286 where the value of the variable missed page rate M' is adjusted. In step 286 the new value of the variable missed page rate M' is scaled up by a factor of two but is not to exceed the value of the missed page rate M. The wake-up routine then proceeds to point 250, which directs the routine to step 232 in FIG. 2a.

By reviewing the wake-up routine flow charts on FIGS. 2a and 2b it can be seen that the wake-up routine will never skip more than fifty percent of the assigned paging slots. Each time the wake-up routine determines that an assigned paging slot is to be skipped 218 the wake-up routine will always direct the phone to wake-up at the following assigned paging slot 242. By limiting the rate at which assigned paging slots may be skipped, the wake-up routine increases the likelihood of an accurate estimate of the actual paging rate R. The threshold for determining whether or not to skip a particular assigned paging slot varies as the paging rate varies. This minimizes the probability of a missed paging message and simultaneously maximizes phone power conservation. When the measured paging rate R is very low the wake-up routine adjusts the decision threshold to increase the number of skipped paging slots. However, the routine will never skip more than 50 percent of the assigned paging slots. A decision to skip an assigned paging slot will always be followed by a wake up decision at the next assigned paging slot. This further ensures that pages will not be missed. From the discussion above it was noted that a wireless phone is able to acknowledge the receipt of a paging message. The phone acknowledgement is used to eliminate the need for the base station to retransmit the paging message. If the phone misses a paging message due to a decision to not wake-up at an assigned paging slot, no corresponding acknowledgement will be sent to the base station. If the base station is configured to repeat paging messages if no acknowledgement is received, the wake-up routine guarantees that the phone will wake-up at the next assigned paging slot to receive the repeated paging message. Thus the phone is guaranteed to be awake at least one assigned paging slot for any paging message.

Figure 3:
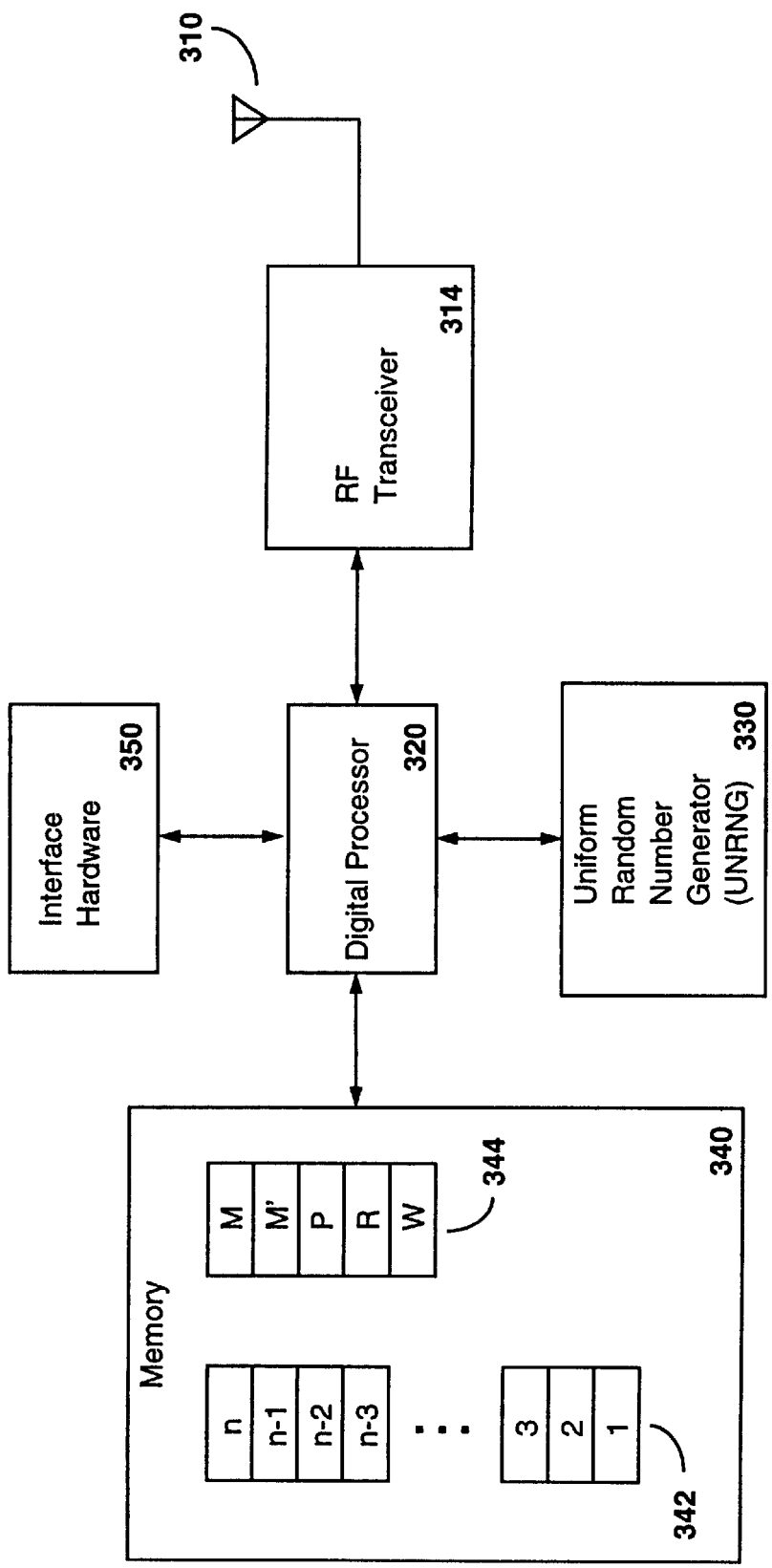
FIG. 3 is a block diagram showing the hardware implementation of the wake-up routine within a mobile phone.

Referring to FIG. 3 the wake-up routine is implemented within a phone with minimal reconfiguration of existing hardware. An antenna 310 provides the RF interface for communication to the base station. It connects to the RF transceiver 314 that provides both receive and transmit functionality. The receiver portion (not shown) of the RF transceiver 314 receives the RF signals collected at the antenna 310. The receiver then downconverts the RF signal and demodulates it into a digital format for processing by the digital processor 320. The digital processor 320 processes the digital signals it receives from the receive portion of the RF transceiver 314 then routes the processed signals to interface hardware 350. In the case of voice calls the interface hardware 351) would include an audio amplifier and speaker. For paging or data messages the interface hardware 350 would include a display. The digital processor 320 interfaces with memory 340 to perform the signal processing. Although not differentiated in FIG. 3, the memory 340 is composed of different types of memory devices. The phone operating system software is stored in nonvolatile memory such as Read Only Memory (ROM), while Random Access Memory (RAM) would be used for temporary storage of values relating to dynamic operations. The values stored in RAM would include the digital signals transferred from the receive portion of the RF transceiver 314 as well as the processed output to be sent to the interface hardware 350.

The transmit signals follow a path that is nearly opposite in direction to the receive signal path. User input is transferred to the phone through the interface hardware 350. The interface hardware 350 may be devices such as a keypad on the handset or a microphone. The digital processor 320 takes the signals input through the interface hardware 350 and processes the signals into a format usable by the RF transceiver 314. The digital processor 320 uses the memory 340 for storage of the phone operating instructions as well as for storage of the input signals and formatted output from the digital processor 320. The digital processor 320 performs formatting functions such as digitizing the input signals, block encoding the digitized input signals, encoding forward error correction to the signals, and CDMA spreading of the signals. Once the digital processor 320 has formatted the input signals, they are transferred to the RF transceiver 314 to be converted to a RF signal at the correct frequency to enable communication with the base station. The RF transceiver 314 converts the digital signals from the digital processor 320 into analog signals then upconverts the analog signal to an assigned RF channel. The RF signal is then amplified and transmitted to the base station via the antenna 310.

When the wake-up routine is incorporated into a phone the digital processor 320 performs all calculations and controls the wake-up of the RF transceiver 314. Constants and calculated values are stored in the phone memory 344. The FIFO stack used to store the number of pages received over a time period T can also be implemented in memory 342. The only additional device required is the Uniform Random Number Generator (URNG) 330. As described above, the URNG 330 calls a random number function that outputs a number over 1–100. The statistics of the random number function exhibit uniform distribution such that all the numbers over 1–100 have equal probability of occurring. The random number function can be provided in a variety of ways. Although there are dedicated Integrated Circuits (ICs) that will generate a random number with uniform distribution, the same function can be built using a series of registers or can be implemented in software. All of these methods of implementing a uniformly distributed random number function are interchangeable and are familiar to one of ordinary skill in the art.

Therefore, the digital processor 320 executes the wake-up routine from instructions stored in phone memory 340. The digital processor 320 stores the page counts in a stack in memory 342 and calculates the values of the total number of pages P, the paging rate R, and W the input to the URNG. These values are all stored in memory locations 344. The digital processor then retrieves the missed page rate M from memory 344 and generates a new value for the variable missed page rate M' based on the calculations for P, R, and W and from the output of the URNG. The values of P, R, W, and M' allow the digital processor 320 to determine probabilistically when to skip the next assigned paging slot. When the assigned paging slot is to be skipped, the digital processor overrides the wake-up control signal to the RF transceiver 314. Thus the sleep time of the phone is increased thereby conserving battery power. The benefits of decreased power drain on the battery include longer phone standby and talk times.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A method for determining wake-up time in a mobile phone operating in slotted paging mode comprising the steps:

a) initializing a variable missed page rate value;
   b) calculating a measured paging rate;
   c) probabilistically determining whether to skip the next assigned paging slot based upon the relationship of the measured paging rate to the variable missed page rate; and
   d) skipping the next assigned paging slot if directed to do so by the probabilistic determination step.

2. The method of claim 1 wherein the step of probabilistically determining whether to skip the next assigned paging slot comprises:

comparing the value of the variable missed page rate to the measured paging rate;
   directing the mobile phone to skip the next assigned paging slot when the variable missed page rate value is greater than the measured paging rate;
   calculating a probability of waking up at the next assigned paging slot if the variable missed page rate value is not greater than the measured paging rate, said probability equal to one minus the ratio of the variable missed paging rate to the measured paging rate;
   generating a uniform random number function output;
   comparing the calculated probability to the uniform random number function output; and
   directing the mobile phone to skip the next assigned paging slot when the variable missed page rate value is not greater than the measured paging rate and the uniform random number function output is greater than the probability of waking up at the next assigned paging slot.

3. The method of claim 2 further comprising the steps:

e) waking up the mobile phone at the next assigned paging slot if the mobile phone was not directed to skip the next assigned paging slot;
   f) waking up the mobile phone at an assigned paging slot immediately following the next assigned paging slot if the mobile phone was directed to skip the next assigned paging slot;
   g) updating the measured paging rate; and
   h) updating the variable missed page rate value
   i) repeating steps c) through h) using the updated measured paging rate and updated variable missed page rate.

4. The method of claim 3 wherein the step of updating the variable missed page rate value comprises:

setting the new variable missed page rate value to one half the present variable missed page rate value if the present variable missed page rate value is greater than the paging rate; and setting the new variable missed page rate value to the minimum of either the initial variable missed page rate or twice the present variable missed page rate if the present variable missed page rate is not greater than the paging rate.

5. The method of claim 3 wherein the step of updating the measured paging rate comprises:

discarding from a memory location the number of paging messages received in the earliest assigned paging slot of a time T;
   storing in the memory location the number of paging messages received in a current assigned paging slot;
   summing the number of paging messages received during the time T; and
   dividing the sum of the paging messages received in time T by a total number of available assigned paging slots in time T.

6. An apparatus for determining wake-up time in a mobile phone operating in slotted paging mode comprising:

means for initializing a variable missed page rate value;
   means for calculating a measured paging rate;
   means for probabilistically determining whether to skip the next assigned paging slot based upon the relationship of the measured paging rate to the variable missed page rate; and
   means for skipping the next assigned paging slot if directed to do so by the probabilistic determination means.

7. The apparatus of claim 6 wherein the means for probabilistically determining whether to skip the next assigned paging slot comprises:

means for comparing the value of the variable missed page rate to the measured paging rate;
   means for directing the mobile phone to skip the next assigned paging slot when the variable missed page rate value is greater than the measured paging rate;
   means for calculating a probability of waking up at the next assigned paging slot if the variable missed page rate value is not greater than the measured paging rate, said probability is equal to one minus the ratio of the variable missed paging rate value to the measured paging rate;
   means for generating a uniform random number function output; and
   means for directing the mobile phone to skip the next assigned paging slot when the variable missed page rate value is not greater than the measured paging rate and the uniform random number function output is greater than the probability of waking up at the next assigned paging slot.

8. The apparatus of claim 7 further comprising:

means for waking up the mobile phone at the next assigned paging slot if the mobile phone was not directed to skip the next assigned paging slot;
   means for waking up the mobile phone at an assigned paging slot immediately following the next assigned paging slot if the mobile phone was directed to skip the next assigned paging slot;
   means for updating the measured paging rate; and
   means for updating the variable missed page rate value.

9. The apparatus of claim 8 wherein the means for updating the variable missed page rate value comprises:

means for setting the new variable missed page rate value to one half the present variable missed page rate value if the present variable missed page rate value is greater than the paging rate; and
   means for setting the new variable missed page rate value to the minimum of either the initial variable missed page rate or twice the present variable missed page rate if the present variable missed page rate is not greater than the paging rate.

* * * * *